June 28, 1932. W. A. AHERN 1,865,225
AUTOMATIC CONTROL OF WATER HEATERS
Filed Feb. 19, 1930  2 Sheets-Sheet 1
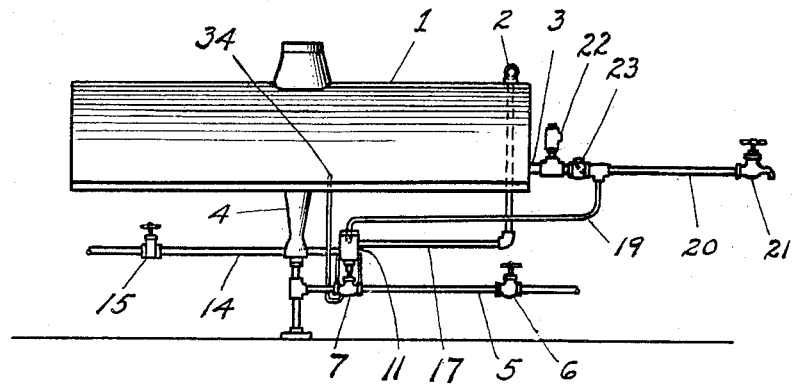
Fig. 1
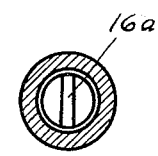
Fig. 4
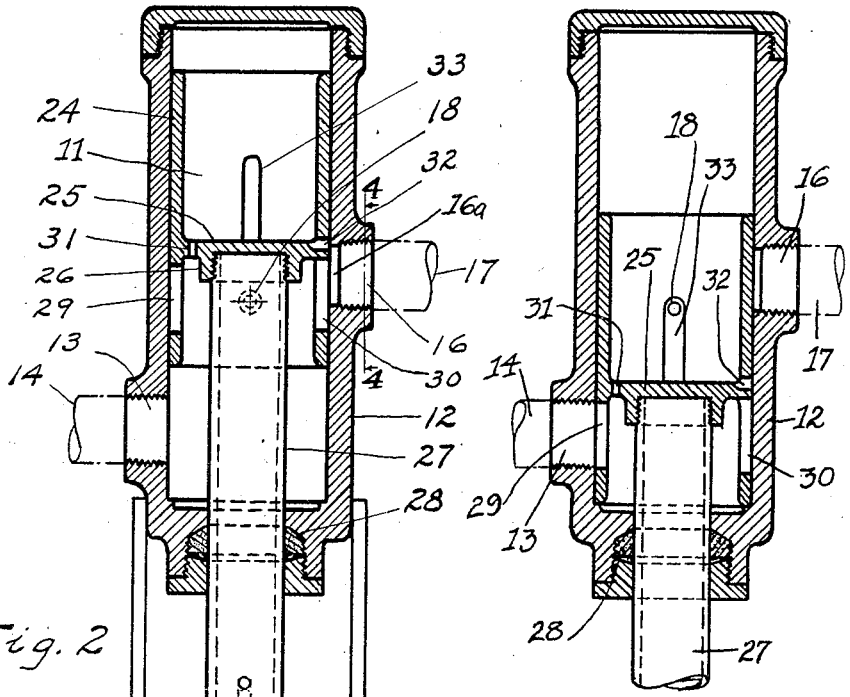
Fig. 2
Fig. 3
William Albert Ahern
INVENTOR
BY Owen W. Kennedy
ATTORNEY
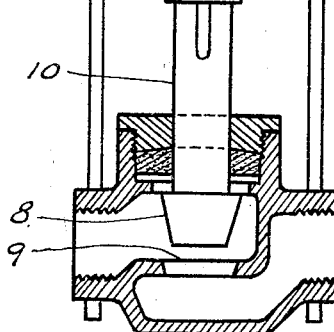

June 28, 1932.  W. A. AHERN  1,865,225
AUTOMATIC CONTROL OF WATER HEATERS
Filed Feb. 19, 1930  2 Sheets-Sheet 2

William Albert Ahern
INVENTOR
BY Owen M. Kennedy
ATTORNEY

Patented June 28, 1932

1,865,225

UNITED STATES PATENT OFFICE

WILLIAM ALBERT AHERN, OF WORCESTER, MASSACHUSETTS

AUTOMATIC CONTROL OF WATER HEATERS

Application filed February 19, 1930. Serial No. 429,751.

The present invention relates to the control of hot water heaters of the type in which the turning on of a hot water faucet will automatically cause the turning on of the fuel supply to the heater, so as to immediately start raising the temperature of the water in the heater to the desired degree.

In the automatic control of water heaters of this type, it is essential that the valve controlling the supply of fuel to the burner be operated as soon as a hot water faucet is turned on, and in my improved mechanism, the flow of water resulting from the opening of a hot water faucet is utilized to immediately cause positive operation of the fuel valve. Furthermore, the device of the present invention so operates that as soon as the fuel valve is open, all water drawn from the hot water faucet must first pass through the heater itself, thereby eliminating all possibility of any cold water from the supply finding its way to the hot water faucet. The above and other advantageous features of my invention will hereinafter more fully appear with reference to the accompanying drawings in which—

Fig. 1 is a diagrammatic view illustrating the automatic control device as employed in connection with a hot water heater.

Fig. 2 is a vertical sectional view showing the automatic control valve on an enlarged scale.

Fig. 3 is a vertical sectional view similar to Fig. 2 showing the valve in an inoperative position.

Fig. 4 is a fragmentary sectional view along the line 4—4 of Fig. 2.

Like reference characters refer to like parts in the different figures.

Figure 5:
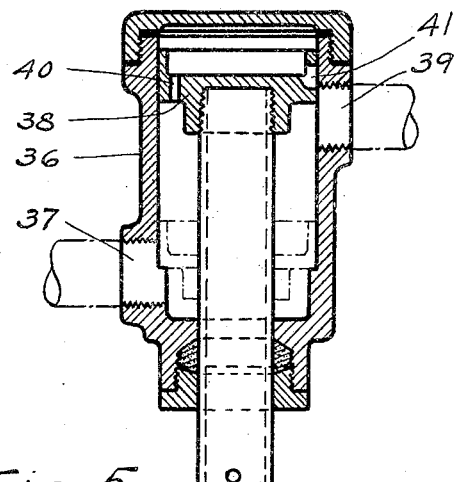
Fig. 5 is a vertical sectional view showing a modified form of automatic control valve.

Referring first to Fig. 1, my invention is shown in connection with a water heater consisting generally of a casing 1 which provides a water chamber having a cold water inlet at 2 and a hot water outlet at 3. The water in the chamber is adapted to be heated by means of a suitable burner 4 adapted to be supplied with fuel, such as gas, through a pipe 5 having a shut-off valve 6 and a throttle valve 7. The fuel valve 7 may be of any desired type, and, as shown in Fig. 2, consists of a valve member 8 cooperating with a seat 9, with the valve member 8 being adapted to be raised or lowered with respect to the seat 9 by means of an operating spindle 10.

As illustrative of one embodiment of my invention, the spindle 10 is adapted to be moved with respect to the valve seat 9 by means of an automatically operated control valve generally designated by the reference numeral 11 in Fig. 1 which valve forms the subject matter of the present invention. The valve 11 comprises a casing 12 having an inlet port 13 connected to a source of water supply, not shown, through a pipe 14 with a shut-off valve 15 and an opposed outlet port 16 connected to the inlet 2 of the heater 1 through a pipe 17, see Fig. 1. The casing 12 further provides a small port 18 at about the same level as the outlet port 16, the port 18 being connected by a bypass pipe 19 to the hot water supply pipe 20 leading from the outlet 3 of the heater 1. The pipe 20 also provides one or more faucets indicated at 21, as well as a pressure relief valve 22 and check valve 23 located between the bypass pipe 19 and the hot water outlet 3, the valves 22 and 23 forming no part of the present invention, as to their construction, although functioning in combination with the other apparatus.

A piston 24 is operable within the control valve casing 12, the piston 24 being in the form of a sleeve with a partition 25 shutting off one side of the piston from the other. The partition 25 provides a boss 26 which is internally threaded to receive a rod 27 extending through the lower end of the casing 12 where it is surrounded by a packing 28 to prevent leakage of water along the rod 27. The rod 27 is suitably connected to the fuel valve spindle 10. The wall of the piston 24 below the partition 25 provides a port 29 which is adapted to register with the inlet port 13 of the casing 12 when the piston 24 is in its lower position, as shown in Fig. 3, and the opposite side of the piston wall also provides a port 30 which is adapted to register with the outlet port 16 when the piston 24 is in its raised position, as shown in Fig. 2.

The partition 25 in the piston 24 provides a restricted orifice 31 which provides communication between the opposite sides of the partition 25 and a second orifice 32 is provided in the wall of the piston at the partition 25, which orifice 32 communicates with the outlet port 16 when the piston 24 is in its raised position, as shown in Fig. 2. In addition, the wall of the piston 24 above the partition 25 provides an elongated slot 33 which registers with the bypass port 18 when the piston 24 is in its lower position, as shown in Fig. 3.

Assuming now that the parts occupy the position shown in Fig. 3 with the hot water faucet 21 closed, it is evident that water under pressure entering the registering ports 13 and 29 will be effective on opposite sides of the partition 25 of the piston 24 on account of the orifice 31 extending through the partition 25. Therefore, the piston 24 will have a pressure exerted thereon tending to maintain it in the position shown in Fig. 3, since the effective area of the upper surface of the partition 25 is greater than the area of the lower side of the partition 25 by an amount substantially equal to the cross sectional area of the rod 27. In this position of the parts, no water can flow through the bypass pipe 19 since the faucet 21 is closed and it is also evident that the fuel control valve 8 will be engaged with its seat 9 as long as the piston 24 remains in its lower position, so that only enough gas is supplied the heater 4 to keep the pilot light 34 ignited. The pilot light 34 receives its gas supply from the inlet side of gas valve 7 so that closure of this valve does not shut off the pilot light.

Let it now be assumed that the hot water faucet 21 is open, thereby permitting water to flow out of the bypass pipe 19 by reason of the fact that the slot 23 above the partition 25 is then in register with the port 18. When this occurs the pressure on the upper side of the partition 25 is released, thereby permitting the piston 24 to move upwardly from the position of Fig. 3 to the position of Fig. 2. As this movement takes place, the port 30 registers with the outlet port 16 thereby supplying water under pressure to the inlet 2 of the heater 1. As the port 30 comes into register with the port 16, the bypass port 18 is covered by the solid wall of the piston 24 below the partition 25, thereby preventing any more cold water flowing out through the faucet 21 from the bypass pipe 19. It should be further noted that before the bypass port 18 is closed, the orifice 32 registers with the outlet port 16, so that the water above the partition 25 will be displaced through the orifice 32 as the piston 24 completes its upward movement. It is also evident from Fig. 2 that as the piston 24 moves to its upper position, the fuel control valve 8 will be lifted, permitting a full supply of fuel to the burner 4. Consequently, water starts to be heated within the burner 1 almost as soon as the faucet 21 is opened, and it is evident that no cold water can enter the hot water pipe 20 when once the bypass port 18 is closed at the beginning of the upward movement of the piston 24.

When the hot water faucet 21 is shut after withdrawing the desired amount of hot water from the heater 1, the parts occupy the position shown in Fig. 2, and since water can then no longer flow from the casing 12 through the outlet port 16, pressure again builds up above the partition 25 owing to the orifice 31 and since the effective area of the upper surface of the partition 25 is greater than the area of the lower surface, the piston 24 immediately starts to move downwardly to the position shown in Fig. 3, thereby moving the fuel supply valve 8 into engagement with its seat 9 to cut off the supply of fuel to the burner 4. The parts remain in this position until the hot water faucet 21 is again opened.

In Fig. 4 it is to be noted that the cross sectional area of the port 16 is not circular, but is rectangular in shape as determined by the proportions of a vertical slot 16a provided in the wall of casing 12 at the inner end of the port 16. The purpose of providing this rectangular slot 16a is to insure that the amount of water admitted to the heater 1 is directly in proportion to the lift of the piston 24. In other words, with the faucet 21 only part way open, only enough water will flow through the slot 16a to cause the piston 24 to be raised part way between the position of Fig. 3 and the position of Fig. 2. Consequently the fuel control valve 8 will be lifted only part way from its seat 9, so as to supply just enough fuel to the burner 4 to heat the limited amount of water being drawn from the faucet 21.

Referring now to Fig. 5, there is shown a modified form of automatic valve which is particularly adapted for use in connection with instantaneous heaters, without any bypass connection, so that all water passing through the valve on the opening of the hot water faucet will pass through the heater. In this modified construction, the valve casing 36 provides an inlet port 37 having direct access to the bottom of the piston 38 when the piston is in its lower position, as indicated in dotted lines. The outlet port 39 leading to the heater is so located that when the piston 38 is in its lower position, the port 39 is above the top of the piston. The piston 38 further provides an orifice 40 leading from one side to the other thereof so that with no water passing through the heater, the greater pressure on the top of the piston 38 holds the piston in its lower position, as shown in dotted lines. However, when the hot water faucet leading from the heater is opened, thereby releasing the pressure above the piston 38, the piston 38 moves upwardly, water above the piston being displaced directly through the outlet port 39 until finally the piston passes the outlet port 39 and establishes direct connection between the ports 37 and 39 below the piston 38. The last portion of the upward movement of the piston 38 is permitted by the orifice 41 formed in the wall of the piston and communicating with the port 39 in the extreme upper position.

Figure 6:
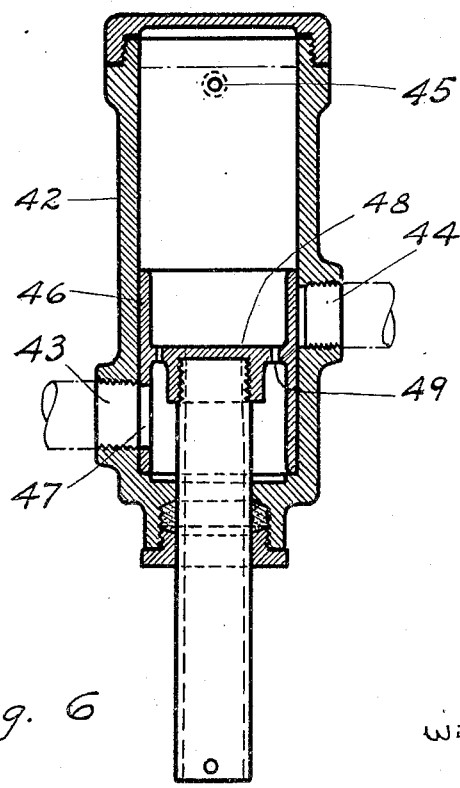
Fig. 6 is a vertical sectional view showing a further modification of the construction of the automatic control valve.

Referring now to Fig. 6, there is shown a still further modification of the automatic control valve, the modified valve being adapted to operate so as to quickly cut off the water pressure from the heater when the hot water faucet is closed. The valve shown in Fig. 5 consists of the casing 42 providing inlet and outlet ports 43 and 44 and a bypass port 45 near the top of the casing 42. The hollow piston 46 provides a port 47 registering with the inlet port 43 with the piston 46 in its lower position, the outlet port 44 then being fully covered by the upper portion of the piston 46 above the partition 48. When the hot water faucet is opened, the pressure above the partition 48 is relieved through the passage of water through the bypass port 45 so that the piston 46 moves upwardly. However, the outlet port 44 is not opened to the heater until the piston 46 has nearly completed its upward stroke, and as the port 44 is fully uncovered, the upper part of the piston 46 covers the bypass port 45, thereby preventing cold water from the bypass port mixing with the hot water coming from the heater. The extreme upper position of the piston 46 is shown in dotted lines. When the hot water faucet is shut off, the water pressure below the piston partition 48 is transmitted to the space above this partition through orifices 49, thereby subjecting the top of the piston to a pressure greater than that exerted on the bottom of the piston, whereupon the piston 46 moves downwardly to quickly close the outlet port 44 leading to the heater. In this way the water pressure is cut off from the heater as soon as the hot water faucet is closed, since the inlet end of check valve 23 cuts off the outlet at the same time pressure is built up through bypass 19.

From the foregoing it is apparent that by the present invention there is provided an extremely simple and effective means for automatically controlling the operation of a hot water heater, the device functioning so as to supply the burner with enough fuel to heat water in accordance with the demand at the hot water faucet. It is to be noted that the device is characterized by the complete absence of springs, the control valve functioning entirely in response to differences in water pressure within the valve arising from the opening and shutting of the hot water faucet. In other words, the device always functions uniformly and is not affected in any way by variations in the pressure of the water supply as would necessarily be the case when utilizing springs to control the movement of the valve.

It is also apparent from the foregoing description that the heater itself is not subjected to the water pressure of the line, the automatic valve acting as a pressure reducer when the water is being heated and as a pressure cutout when it closed to shut off the burner. Therefore, the pressure on the heater is only the head against which the water is elevated from the heater to the faucet in addition to the few pounds pressure necessary for operating the moving parts of the valve. For this reason the employment of my improved automatic control valve in a hot water system gives the equivalent of a low pressure system, thereby making it possible to effect a saving in the manufacturing cost of the heater itself, with better heat transfer owing to the fact that thinner stock can be employed for the walls of the water chamber.

While in the illustrative embodiment of the invention, shown in Figs. 1 and 2, the movement of the valve spindle 10 is employed to operate the valve member controlling the flow of gas to the heater, it is obvious that the movement of the spindle 10 could be as well employed for operating the switch of an electric heater or for other analogous purposes.

I claim:

1. In a device of the class described, an automatic control device comprising a cylinder having an inlet port connected to a source of fluid under pressure, an outlet port connected through a water heater to a fluid valve, a relief port connected directly to said valve, a hollow piston movable in said cylinder carrying a rod extending outside of said cylinder and a partition intermediate the ends of said piston having a passage therethrough, whereby pressure entering said inlet port will hold said piston at the rod end of said cylinder, due to the difference in areas on opposite sides of said partition, and whereby the opening of said fluid valve will move said piston to open the outlet port, due to the passage of fluid through said relief port.

2. In a device of the class described, the combination with a source of water pressure, and a water heater through which water from said source can flow to a fluid valve, of an automatic control device interposed between said heater and said source of pressure comprising a cylinder having an outlet port connected to said heater, a relief outlet port connected directly to said valve, an inlet port connected to said source of pressure, a piston carrying a rod adapted to be operated in opposite directions in response to water pressure, and a restricted passage to transfer the pressure from one side of said piston to the other when said outlets are closed for causing travel of said piston to the rod end of said cylinder due to the reduction of area on the rod side of said piston, the said heater being shut off from the source of pressure by the closing of the outlet port with the piston at the rod end of said cylinder and by means of a check valve interposed between said water heater and the relief line connection to said fluid valve.

3. In a device of the class described, an automatic control device comprising a cylinder having an inlet port connected to a source of fluid under pressure, an outlet port connected to a water heater through which water may flow to a valve and a relief port connected directly to said valve, a piston movable in said cylinder carrying a rod extending outside of said cylinder, said piston having a passage therethrough, said piston when at the rod end of the cylinder being arranged to close said outlet port.

4. In a device of the class described, an automatic control device comprising a cylinder having an inlet port connected to a source of fluid under pressure, an outlet port connected to a water heater through which water may flow to a valve and a relief port connected directly to said valve, a piston movable in said cylinder carrying a rod extending outside of said cylinder, said piston having a passage therethrough, said piston being arranged to close said relief port as the piston is moved away from the rod end of the cylinder, thereby to prevent flow of water from said cylinder directly to said valve.

5. In a device of the class described, an automatic control device, comprising a cylinder having an inlet port, an outlet port connected through a water heater to a fluid valve, and a relief port directly connected to said fluid valve, a piston movable in said cylinder and carrying a rod extending outside of said cylinder, said piston having a passage therethrough, said piston when at the rod end of the cylinder closing the outlet port, and a check valve interposed between said water heater and the relief line connection to said fluid valve.

6. In a device of the class described, an automatic control device, comprising a cylinder having an inlet port, an outlet port connected through a water heater to a fluid valve, and a relief port directly connected to said fluid valve, a piston movable in said cylinder and carrying a rod extending outside of said cylinder, said piston having a passage therethrough, said piston when at the rod end of the cylinder closing the outlet port, and when at the other end closing the relief port.

WILLIAM ALBERT AHERN.